(12) United States Patent
Huang et al.

(10) Patent No.: US 11,741,583 B2
(45) Date of Patent: *Aug. 29, 2023

(54) FACE IMAGE PROCESSING METHOD AND APPARATUS, ELECTRONIC DEVICE, AND STORAGE MEDIUM

(71) Applicant: BEIJING SENSETIME TECHNOLOGY DEVELOPMENT CO., LTD., Beijing (CN)

(72) Inventors: Mingyang Huang, Beijing (CN); Wanzeng Fu, Beijing (CN); Jianping Shi, Beijing (CN); Yi Qu, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/696,240

(22) Filed: Mar. 16, 2022

(65) Prior Publication Data

US 2022/0207911 A1 Jun. 30, 2022

Related U.S. Application Data

(63) Continuation of application No. 16/729,427, filed on Dec. 29, 2019, now Pat. No. 11,341,768, which is a (Continued)

(30) Foreign Application Priority Data

Sep. 28, 2018 (CN) .......................... 201811141270.9

(51) Int. Cl.
*G06V 40/16* (2022.01)
*G06T 5/00* (2006.01)
(Continued)

(52) U.S. Cl.
CPC .............. *G06T 5/005* (2013.01); *G06T 5/002* (2013.01); *G06T 5/20* (2013.01); *G06T 7/90* (2017.01);
(Continued)

(58) Field of Classification Search
CPC .. G06V 40/162; G06V 40/165; G06V 40/171; G06V 10/56; G06V 40/166;
(Continued)

(56) References Cited

U.S. PATENT DOCUMENTS 10,929,649 B2    2/2021  Qin et al.
11,341,768 B2 *  5/2022  Huang ................. G06V 40/171
(Continued)

FOREIGN PATENT DOCUMENTS

CN    102201061 A    9/2011
CN    104091162 A    10/2014
(Continued)

OTHER PUBLICATIONS

International Search Report in the international application No. PCT/CN2018/117498, dated Jun. 27, 2019, 10 pgs.
(Continued)

*Primary Examiner* — Phuoc Tran
(74) *Attorney, Agent, or Firm* — Cooper Legal Group, LLC

(57) ABSTRACT

A face image processing method and apparatus, an electronic device, and a storage medium are provided. The method includes: obtaining face key points and a face deflection angle in a face image; determining a submalar triangle center in the face image according to the face key points and the face deflection angle; determining a submalar triangle region in the face image according to the face key points and the submalar triangle center; and performing color filling on the submalar triangle region. By means of the (Continued)

present disclosure, a submalar triangle region can be accurately positioned, and submalar triangle filling is performed based on the accurately positioned submalar triangle region, thereby obtaining a more natural filling effect.

19 Claims, 23 Drawing Sheets

Related U.S. Application Data continuation of application No. PCT/CN2018/117498, filed on Nov. 26, 2018.

(51) Int. Cl.
    *G06T 7/90*     (2017.01)
    *G06T 5/20*     (2006.01)
    *G06V 10/56*     (2022.01)

(52) U.S. Cl.
    CPC ............ *G06V 10/56* (2022.01); *G06V 40/162* (2022.01); *G06V 40/165* (2022.01); *G06V 40/171* (2022.01); *G06T 2207/30201* (2013.01)

(58) Field of Classification Search
    CPC .. G06T 5/002; G06T 5/20; G06T 7/90; G06T 2207/30201; G06T 5/005
    See application file for complete search history.

(56) References Cited

U.S. PATENT DOCUMENTS

| | | |
|---|---|---|
| 2003/0123713 A1 | 7/2003 | Geng |
| 2008/0080746 A1 | 4/2008 | Payonk |
| 2010/0166331 A1 | 7/2010 | Chan |
| 2012/0133753 A1 | 5/2012 | Chang |
| 2016/0022041 A1 | 1/2016 | Savovic |
| 2016/0148532 A1 | 5/2016 | Yamanashi et al. |
| 2017/0242554 A1 | 8/2017 | Nanjunda et al. |

FOREIGN PATENT DOCUMENTS

| | | |
|---|---|---|
| CN | 104599297 A | 5/2015 |
| CN | 106446781 A | 2/2017 |
| CN | 107862274 A | 3/2018 |
| CN | 107958439 A | 4/2018 |
| CN | 108346171 A | 7/2018 |
| CN | 108447017 A | 8/2018 |
| CN | 108550185 A | 9/2018 |
| JP | 2012095730 A | 5/2012 |
| TW | 201306573 A | 2/2013 |
| TW | 201610866 A | 3/2016 |

OTHER PUBLICATIONS

"Interactive Image Warping", May 1993, Andeas Gustafsson, Helsinki University of Technology, Master's Thesis Abstract, 65 pgs.
First Office Action of the Chinese application No. 201811141270.9, dated Mar. 27, 2020, 15 pgs.
"Centripetal Catmull-Rom spline"; Wikipedia, Reprinted from the Interet at: https://en.wikipedia.org/wiki/Centripetal_Catmull-Rom_spline, 6 pgs.
First Office Action of the Taiwanese application No. 108129695, dated Jul. 27, 2020, 8 pgs.
Second Office Action of the Chinese application No. 201811141270.9, dated Nov. 4, 2020, 12 pgs.
Notice of Allowance of the Chinese application No. 201811141270.9, dated Mar. 17, 2021, 5 pgs.
First Office Action of the Japanese application No. 2019-571734, dated Dec. 25, 2020, 3 pgs.
First Office Action of the U.S. Appl. No. 16/729,427, dated Oct. 15, 2021, 34 pgs.
Written Opinion of the International Search Authority in the international application No. PCT/CN2018/117498, dated Jun. 27, 2019, 11 pgs.

\* cited by examiner

FACE IMAGE PROCESSING METHOD AND APPARATUS, ELECTRONIC DEVICE, AND STORAGE MEDIUM

CROSS-REFERENCE TO RELATED APPLICATIONS

This is a continuation of U.S. patent application Ser. No. 16/729,427, filed on Dec. 29, 2019, which is a continuation of International Patent Application No. PCT/CN2018/117498, filed on Nov. 26, 2018, which claims priority to Chinese Patent Application No. 201811141270.9, filed on Sep. 28, 2018. The disclosures of U.S. patent application Ser. No. 16/729,427, International Patent Application No. PCT/CN2018/117498, and Chinese Patent Application No. 201811141270.9 are hereby incorporated by reference in their entireties.

BACKGROUND

Plump full submalar triangles soften the face and harmonize with the over-high parts of the cheekbones, making people more affable when they smile. How to accurately perform submalar triangle filling on a face image so as to make the submalar triangles in the face image full and natural is an urgent problem to be solved.

SUMMARY

The present disclosure relates to the field of computer vision technologies, and in particular, to face image processing methods and apparatus, electronic devices, and storage media.

Embodiments of the present disclosure provide technical solutions for face image processing.

According to a first aspect of the embodiments of the present disclosure, a face image processing method is provided, including: obtaining face key points and a face deflection angle in a face image; determining a submalar triangle center in the face image according to the face key points and the face deflection angle; determining a submalar triangle region in the face image according to the face key points and the submalar triangle center; and performing color filling on the submalar triangle region.

According to a second aspect of the embodiments of the present disclosure, a face image processing method is provided, including: an obtaining module, configured to obtain face key points and a face deflection angle in a face image; a first determining module, configured to determine a submalar triangle center in the face image according to the face key points and the face deflection angle; a second determining module, configured to determine a submalar triangle region in the face image according to the face key points and the submalar triangle center; and a filling module, configured to perform color filling on the submalar triangle region.

According to a third aspect of the embodiments of the present disclosure, an electronic device is provided, including: a processor, and a memory for storing computer program executable by a processor; where the processor is configured to execute the computer program to implement the foregoing face image processing method.

According to a fourth aspect of the embodiments of the present disclosure, a computer-readable storage medium is provided, having computer program instructions stored thereon, where the computer program instructions, when being executed by a processor, cause the processor to implement the foregoing face image processing method.

The other features and aspects of the present disclosure can be described more clearly according to the detailed descriptions of the exemplary embodiments in the accompanying drawings.

BRIEF DESCRIPTION OF DRAWINGS

The accompanying drawings included in the specification and constituting a part of the specification illustrate the exemplary embodiments, features, and aspects of the present disclosure together with the specification, and are used for explaining the principles of the present disclosure.

DETAILED DESCRIPTION

The various exemplary embodiments, features, and aspects of the present disclosure are described below in detail with reference to the accompanying drawings. The same signs in the accompanying drawings represent elements having the same or similar functions. Although the various aspects of the embodiments are illustrated in the accompanying drawings, unless stated particularly, it is not required to draw the accompanying drawings in proportion.

The special word "exemplary" here means "used as examples, embodiments, or descriptions". Any "exemplary" embodiment given here is not necessarily construed as being superior to or better than other embodiments.

In addition, numerous details are given in the following detailed description for the purpose of better explaining the embodiments of the present disclosure. It should be understood by persons skilled in the art that the present disclosure can still be implemented even without some of those details. In some of the examples, methods, means, elements, and circuits that are well known to persons skilled in the art are not described in detail so that the principle of the present disclosure becomes apparent.

Figure 1:
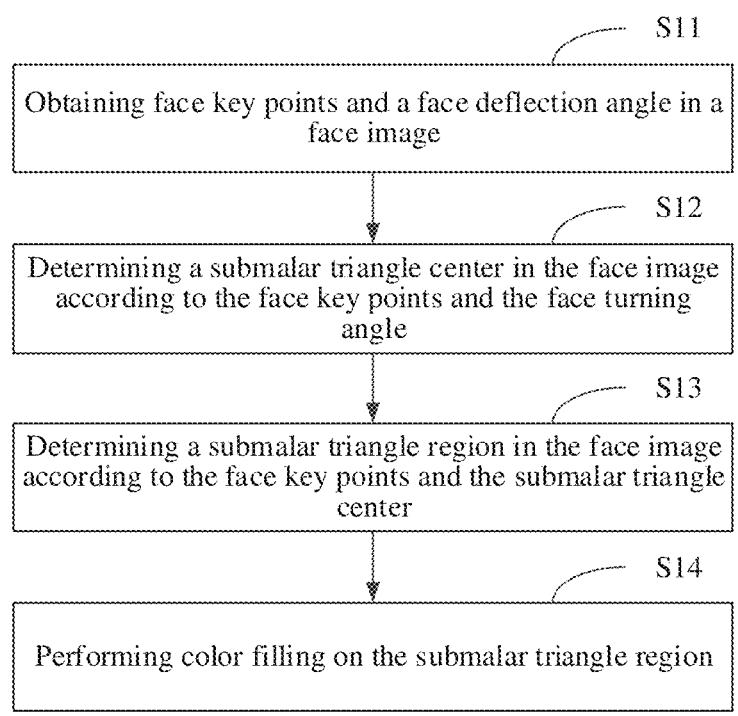
FIG. 1 is a schematic flowchart of a face image processing method according to the embodiments of the present disclosure.

FIG. 1 is a schematic flowchart of a face image processing method according to the embodiments of the present disclosure. As shown in FIG. 1, the method includes operations S11 to S14.

In operation S11, face key points and a face deflection angle in a face image are obtained.

In a possible implementation, the face key point may include at least one of an eye key point, a nose key point, a mouth key point, a cheek key point, a facial contour key point, or the like.

In a possible implementation, the face deflection angle may represent a deflection angle of the face with respect to the full frontal face. For example, if the face is a full frontal face, the face deflection angle is 0; if the face is turned to the left with respect to the full frontal face, the face deflection angle is equal to the angle between the face turned and the full frontal face; and if the face is turned to the right with respect to the full frontal face, the absolute value of the face deflection angle is equal to the angle between the face turned and the full frontal face, and the face deflection angle is a negative number.

In operation S12, a submalar triangle center in the face image is determined according to the face key points and the face deflection angle.

In a possible implementation, the submalar triangle center in the face image may be determined according to an eye key point, a nose key point, and a cheek key point in the face key points and the face deflection angle.

In the embodiments of the present disclosure, the submalar triangle center in the face image is determined by using the face key points in combination with the face deflection angle. Thus, the accuracy of the determined submalar triangle center can be improved, thereby improving the accuracy of the determined submalar triangle region.

In the embodiments of the present disclosure, the submalar triangle may also be called risorius, and refers to inverted triangular tissue located two centimeters below the eye. When you smile or make a facial expression, the inverted triangular tissue will swell slightly because of the compression from the facial muscles and look like a round and shiny apple, and is called the "submalar triangle".

In operation S13, a submalar triangle region in the face image is determined according to the face key points and the submalar triangle center.

In the embodiments of the present disclosure, the submalar triangle region in the face image may be determined according to the submalar triangle center and some of the face key points to reduce the amount of calculation for determining the submalar triangle region.

In operation S14, color filling is performed on the submalar triangle region.

In a possible implementation, color filling may be performed on the submalar triangle region by one or both of a circular convex lens deformation method and a circular liquefaction deformation method, so as to achieve the effects of making the submalar triangle full and accentuating the contour line of the submalar triangle.

In some embodiments of the present disclosure, the operations S11 to S14 may be executed by a processor by invoking a corresponding instruction stored in a memory, or executed by corresponding module run by the processor.

Figure 2A:
FIG. 2A is a schematic diagram of a face image before color filling is performed on the submalar triangle region in a face image processing method according to the embodiments of the present disclosure.
Figure 2B:
FIG. 2B is a schematic diagram of a face image after color filling is performed on the submalar triangle region in a face image processing method according to the embodiments of the present disclosure.

FIG. 2A is a schematic diagram of a face image before color filling is performed on the submalar triangle region in a face image processing method according to the embodiments of the present disclosure. FIG. 2B is a schematic diagram of a face image after color filling is performed on the submalar triangle region in a face image processing method according to the embodiments of the present disclosure.

In the embodiments of the present disclosure, by obtaining face key points and a face deflection angle in a face image, determining a submalar triangle center in the face image according to the face key points and the face deflection angle, determining a submalar triangle region in the face image according to the face key points and the submalar triangle center, and performing color filling on the submalar triangle region, the submalar triangle region can be accurately determined, and submalar triangle filling is performed based on the accurately positioned submalar triangle region, thereby obtaining a more natural filling effect.

Figure 3:
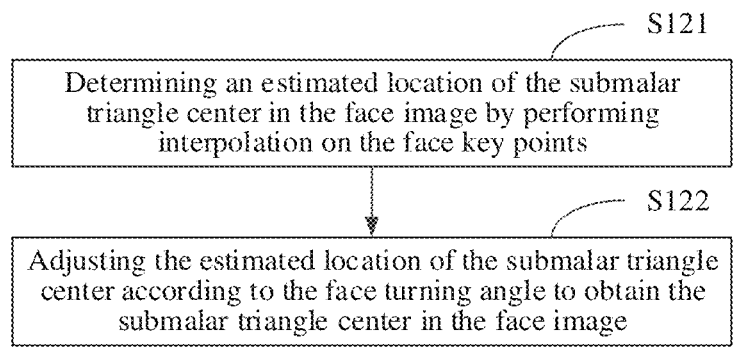
FIG. 3 is an exemplary schematic flowchart of operation S12 of a face image processing method according to the embodiments of the present disclosure.

FIG. 3 is an exemplary schematic flowchart of operation S12 of a face image processing method according to the embodiments of the present disclosure. As shown in FIG. 3, the operation S12 may include the following operations S121 and S122.

In operation S121, interpolation is performed on the face key points to determine an estimated location of the submalar triangle center in the face image.

In the embodiments of the present disclosure, the submalar triangle center is generally located 2-3 centimeters below the eye. By performing interpolation on the face key points, an estimated location of the submalar triangle center in the face image may be determined. For example, interpolation may be performed on an eye key point, a nose key point, and a cheek key point to obtain the estimated location of the submalar triangle center in the face image.

In operation S122, the estimated location of the submalar triangle center is adjusted according to the face deflection angle to obtain the submalar triangle center in the face image.

In the embodiments of the present disclosure, if the face deflection angle is 0, the estimated location of the submalar triangle center is directly used as the submalar triangle center in the face image without adjusting the estimated location of the submalar triangle center. If the face deflection angle is not 0, the estimated location of the submalar triangle center is adjusted according to the face deflection angle to obtain the submalar triangle center in the face image.

Figure 4:
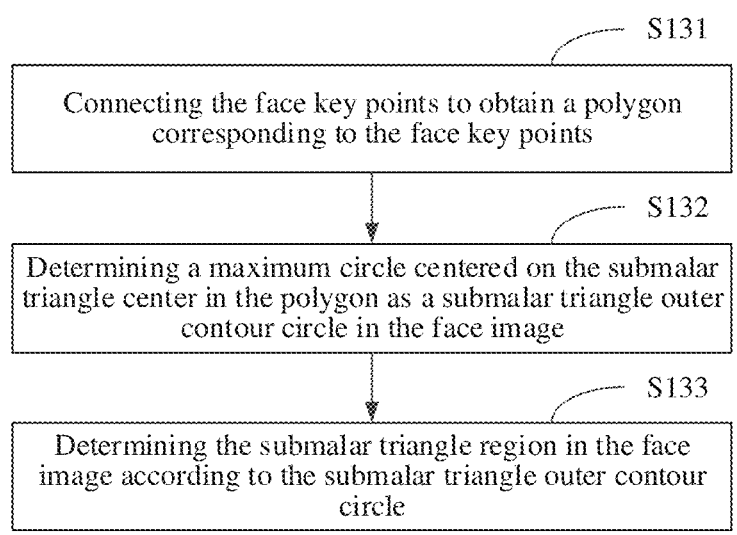
FIG. 4 is an exemplary schematic flowchart of operation S13 of a face image processing method according to the embodiments of the present disclosure.

FIG. 4 is an exemplary schematic flowchart of operation S13 of a face image processing method according to the embodiments of the present disclosure. As shown in FIG. 4, operation S13 may include the following operations S131 to S133.

In operation S131, the face key points are connected to obtain a polygon corresponding to the face key points.

In a possible implementation, some of facial contour key points, some of nose key points, and some of eye key points in the face key points may be connected to obtain a polygon corresponding to these face key points. Among them, the eye key point may be a key point at the lower eyelid.

In operation S132, a maximum circle centered on the submalar triangle center in the polygon is determined as a submalar triangle outer contour circle in the face image.

In the embodiments of the present disclosure, a circle centered on the submalar triangle center is drawn with the polygon as the boundary to obtain the submalar triangle outer contour circle in the face image.

In some embodiments of the present disclosure, the operations S131 to S133 may be executed by a processor by invoking a corresponding instruction stored in a memory, or executed by corresponding module run by the processor.

Figure 5:
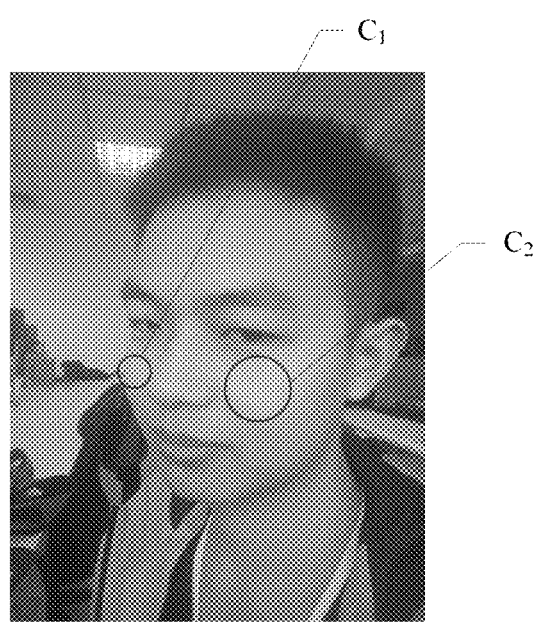
FIG. 5 is a schematic diagram of a submalar triangle outer contour circle in a face image processing method according to the embodiments of the present disclosure.

FIG. 5 is a schematic diagram of a submalar triangle outer contour circle in a face image processing method according to the embodiments of the present disclosure. In the example shown in FIG. 5, submalar triangle outer contour circles in a face image include C1 and C2.

In operation S133, the submalar triangle region in the face image is determined according to the submalar triangle outer contour circle.

In a possible implementation, the determining the submalar triangle region in the face image according to the submalar triangle outer contour circle includes: determining the region where the submalar triangle outer contour circle is located as the submalar triangle region in the face image.

In another possible implementation, the determining the submalar triangle region in the face image according to the submalar triangle outer contour circle includes: adjusting the submalar triangle outer contour circle by using a facial contour line in the face image to obtain the submalar triangle region in the face image. In this implementation, the submalar triangle outer contour circle may be confined by the facial contour line in the face image to limit the submalar triangle region within the face contour. In this implementation, the submalar triangle outer contour circle may be adjusted by means of the part of the facial contour line below the eye and above the corner of the mouth to obtain the submalar triangle region in the face image.

Figure 6:
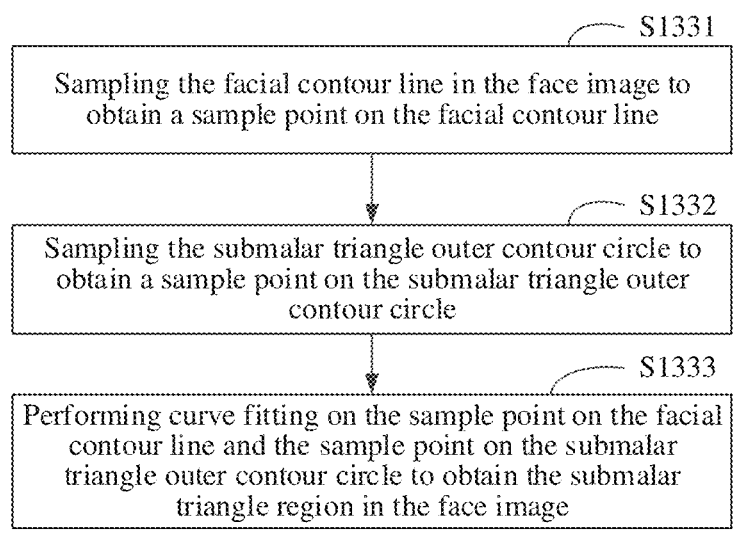
FIG. 6 is an exemplary schematic flowchart of adjusting the submalar triangle outer contour circle by using a facial contour line in the face image to obtain the submalar triangle region in the face image in a face image processing method according to the embodiments of the present disclosure.

FIG. 6 is an exemplary schematic flowchart of adjusting the submalar triangle outer contour circle by using a facial contour line in the face image to obtain the submalar triangle region in the face image in a face image processing method according to the embodiments of the present disclosure. As shown in FIG. 6, the adjusting the submalar triangle outer contour circle by using a facial contour line in the face image to obtain the submalar triangle region in the face image may include operations S1331 to S1333.

In operation S1331, the facial contour line in the face image is sampled to obtain a sample point on the facial contour line.

In a possible implementation, the part of the facial contour line below the eye and above the corner of the mouth may be sampled to obtain a sample point on the facial contour line.

In operation S1332, the submalar triangle outer contour circle is sampled to obtain a sample point on the submalar triangle outer contour circle.

In operation S1333, curve fitting is performed on the sample point on the facial contour line and the sample point on the submalar triangle outer contour circle to obtain the submalar triangle region in the face image.

In a possible implementation, curve fitting may be performed on the sample point on the facial contour line and the sample point on the submalar triangle outer contour circle by a Catmull-Rom curve fitting method to obtain the submalar triangle region in the face image.

In some embodiments of the present disclosure, the operations S1331 to S1333 may be executed by a processor by invoking a corresponding instruction stored in a memory, or executed by corresponding module run by the processor.

Figure 7:
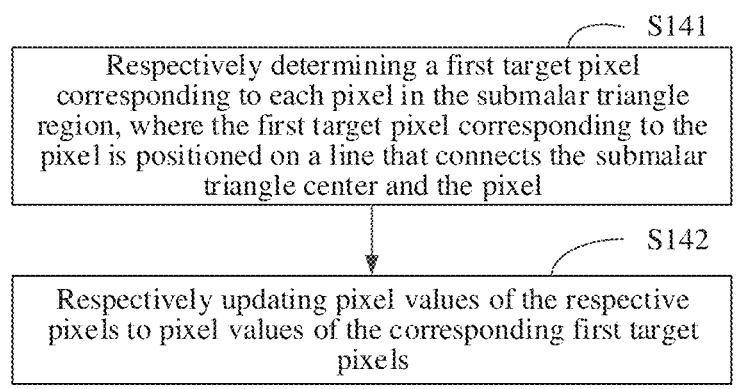
FIG. 7 is an exemplary schematic flowchart of operation S14 of a face image processing method according to the embodiments of the present disclosure.

FIG. 7 is an exemplary schematic flowchart of operation S14 of a face image processing method according to the embodiments of the present disclosure. As shown in FIG. 7, operation S14 may include operations S141 and S142.

In operation S141, a first target pixel corresponding to each pixel in the submalar triangle region is respectively determined, where the first target pixel corresponding to the pixel is positioned on a line connecting the submalar triangle center and the pixel.

In a possible implementation, the respectively determining a first target pixel corresponding to each pixel in the submalar triangle region includes: respectively determining the first target pixel corresponding to each pixel in the submalar triangle region according to a submalar triangle filling strength coefficient. The submalar triangle filling strength coefficient may be customized by a user. The submalar triangle filling strength coefficient indicates a degree of deformation of the submalar triangle. For example, the greater the submalar triangle filling strength coefficient, the greater the degree of deformation of the submalar triangle; and the smaller the submalar triangle filling strength coefficient, the smaller the degree of deformation of the submalar triangle.

In a possible implementation, the respectively determining a first target pixel corresponding to each pixel in the submalar triangle region includes: respectively determining the first target pixel corresponding to each pixel in the submalar triangle region by using a convex downward function having a second derivative constantly greater than 0. For example, the function is $y=1-sx^2$, where $$X = \frac{D_{OP_1}}{R}, \text{ and } y = \frac{D_{OP_1'}}{R}.$$

$P_1$ represents a certain pixel in the submalar triangle region, $D_{OP_1}$ represents the distance between the submalar triangle center and the pixel, $P_1'$ represents the first target pixel corresponding to the pixel, $D_{OP_1'}$ represents the distance between the submalar triangle center and the first target pixel, S represents the submalar triangle filling strength coefficient, and A has a value range of [0, 1]. By this function, the range of deformation may be limited to the submalar triangle region, and changes in the submalar triangle region are continuous. The effect of pixels in the submalar triangle region spreading outward in the radius direction can be achieved by means of the convex downward function having a second derivative constantly greater than 0.

Figure 8:
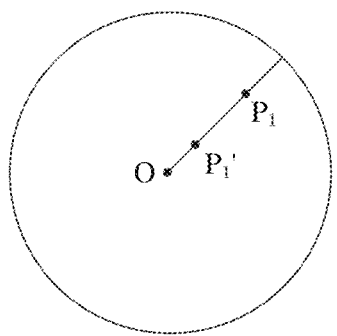
FIG. 8 is a schematic diagram of operation S141 of a face image processing method according to the embodiments of the present disclosure.

FIG. 8 is a schematic diagram of operation S141 of a face image processing method according to the embodiments of the present disclosure. As shown in FIG. 8, by taking the pixel value of pixel $P_1'$ as the pixel value of pixel $P_1$, the effect of moving pixel $P_1'$ to pixel $P_1$ may be achieved.

In operation S142, pixel values of the respective pixels are respectively updated to pixel values of the corresponding first target pixels.

In the example shown in FIG. 8, the pixel value of pixel $P_1$ is updated to the pixel value of pixel $P_1'$, that is, the pixel value of pixel $P_1'$ is taken as the pixel value of pixel $P_1$.

In the examples shown in FIG. 7 and FIG. 8, by changing the density distribution of pixel points in the submalar triangle region using a circular convex lens deformation method, the deformation effect of which is that pixels in the center of the submalar triangle region spread outward in the radius direction, submalar triangle filling is performed, making the submalar triangle full. The deformation in the examples is constrained by both the submalar triangle region and the submalar triangle center.

In some embodiments of the present disclosure, the operations S141 and S142 may be executed by a processor by invoking a corresponding instruction stored in a memory, or executed by corresponding module run by the processor.

Figure 9:
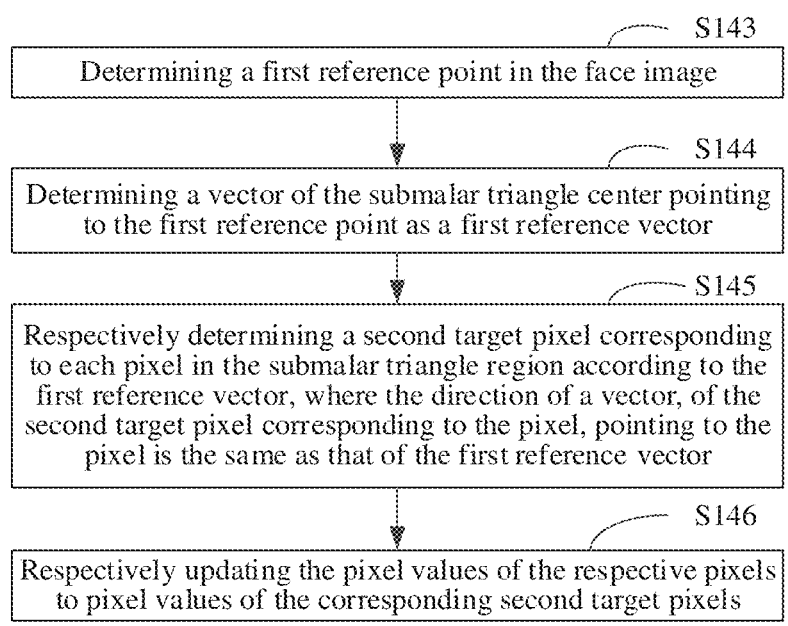
FIG. 9 is an exemplary schematic flowchart of operation S14 of a face image processing method according to the embodiments of the present disclosure.

FIG. 9 is an exemplary schematic flowchart of operation S14 of a face image processing method according to the embodiments of the present disclosure. As shown in FIG. 9, operation S14 may include operations S143 to S146.

In operation S143, a first reference point in the face image is determined.

In a possible implementation, the distance between the first reference point and a nose tip key point is greater than the distance between the submalar triangle center and the nose tip key point. That is, in this implementation, the first reference point is closer to the facial contour than the submalar triangle center.

In a possible implementation, the first reference point is outside the submalar triangle region. For example, the distance between the submalar triangle center and the first reference point is $\sqrt{2}$, times of the radius of the submalar triangle outer contour circle.

For example, the first reference point in the face image is $M_1$.

In operation S144, a vector that points from the submalar triangle center to the first reference point is determined as a first reference vector.

For example, if the submalar triangle center is O, $\vec{O}$ represents a vector that points from a first reference pixel to the submalar triangle center, the first reference point is $M_1$, and $\vec{M}_1$ represents a vector that points from the first reference pixel to the first reference point, the first reference vector may be represented as $\hat{M}_1 - \vec{O}$. The first reference pixel may be the origin of a coordinate axis.

In operation S145, a second target pixel corresponding to each pixel in the submalar triangle region is respectively determined according to the first reference vector, where the direction of a vector that points from the second target pixel to its corresponding pixel is the same as that of the first reference vector.

In operation S146, the pixel values of the respective pixels are respectively updated to pixel values of the corresponding second target pixels.

For example, if the second target pixel corresponding to pixel $P_2$ in the submalar triangle region is pixel $P_2'$, the pixel value of pixel $P_2$ may be updated to the pixel value of pixel $P_2'$, that is, the pixel value of pixel $P_2'$ is taken as the pixel value of pixel $P_2$.

In some embodiments of the present disclosure, the operations S143 to S146 may be executed by a processor by invoking a corresponding instruction stored in a memory, or executed by corresponding module run by the processor.

In the example shown in FIG. 9, by changing the density distribution of pixel points in the submalar triangle region using a circular liquefaction deformation method, the deformation effect of which is that pixels in the center of the submalar triangle region spreads outward in a uniform direction, the submalar triangle is filled, and the contour line of the submalar triangle is accentuated, making the submalar triangle full and stereoscopic. The range of deformation in the example shown in FIG. 9 is constrained and determined by both the submalar triangle region and the submalar triangle center.

Figure 10:
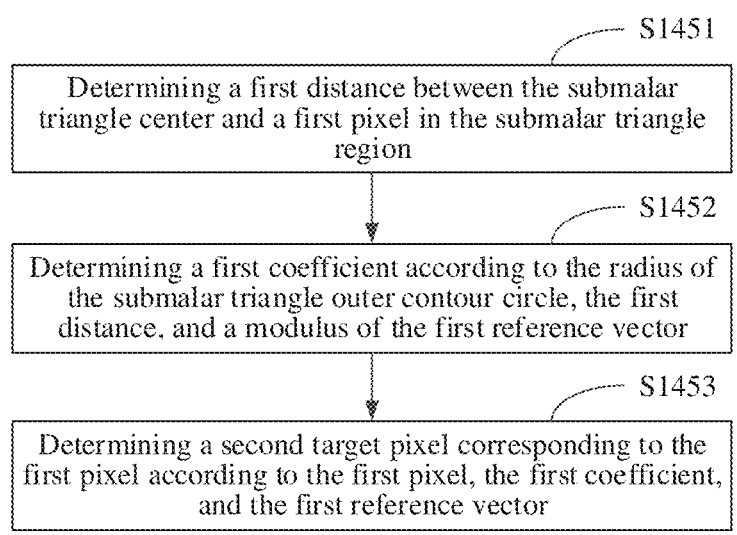
FIG. 10 is an exemplary schematic flowchart of operation S145 of a face image processing method according to the embodiments of the present disclosure.

FIG. 10 is an exemplary schematic flowchart of operation S145 of a face image processing method according to the embodiments of the present disclosure. As shown in FIG. 10, operation S145 may include operations S1451 to S1453.

In operation S1451, a first distance between the submalar triangle center and a first pixel in the submalar triangle region is determined.

For example, if the submalar triangle center is O, the first pixel in the submalar triangle region is $P_2$, $\vec{O}$ represents a vector that points from the first reference pixel to the submalar triangle center, and $\vec{P}_2$ represents a vector of the first reference pixel pointing to the first pixel, the first distance between the submalar triangle center and the first pixel in the submalar triangle region may be represented as $|\vec{P}_2 - \vec{O}|$.

In operation S1452, a first coefficient is determined according to the radius of the submalar triangle outer contour circle, the first distance, and a modulus of the first reference vector.

For example, the radius of the submalar triangle outer contour circle is R, the first distance is $|\vec{P}_2 - \vec{O}|$, the first reference vector is $|\vec{M}_1 - \vec{O}|$, and the first coefficient is $\alpha_1$.

In operation S1453, a second target pixel corresponding to the first pixel is determined according to the first pixel, the first coefficient, and the first reference vector.

In some embodiments of the present disclosure, the operations S1451 to S1453 may be executed by a processor by invoking a corresponding instruction stored in a memory, or executed by corresponding module run by the processor.

Figure 11:
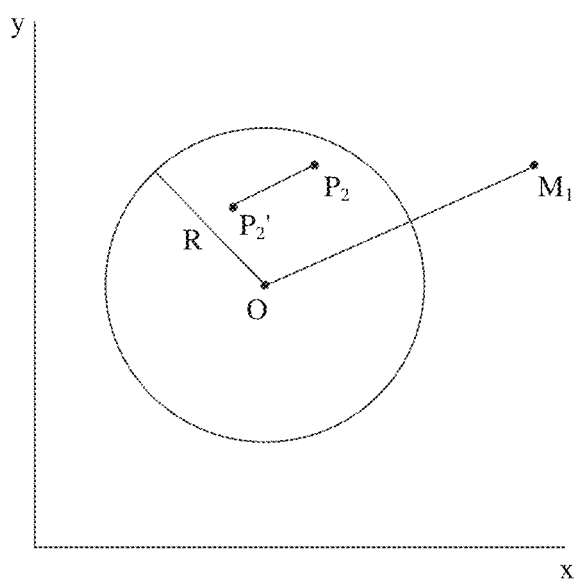
FIG. 11 is a schematic diagram of a submalar triangle center O, a first reference point M1, a first pixel P2, a second target pixel P2' corresponding to the first pixel, and the radius R of a submalar triangle outer contour circle in a face image processing method according to the embodiments of the present disclosure.

FIG. 11 is a schematic diagram of a submalar triangle center O, a first reference point $M_1$, a first pixel $P_2$, a second target pixel $P_2'$ corresponding to the first pixel, and the radius R of a submalar triangle outer contour circle in a face image processing method according to the embodiments of the present disclosure.

Figure 12:
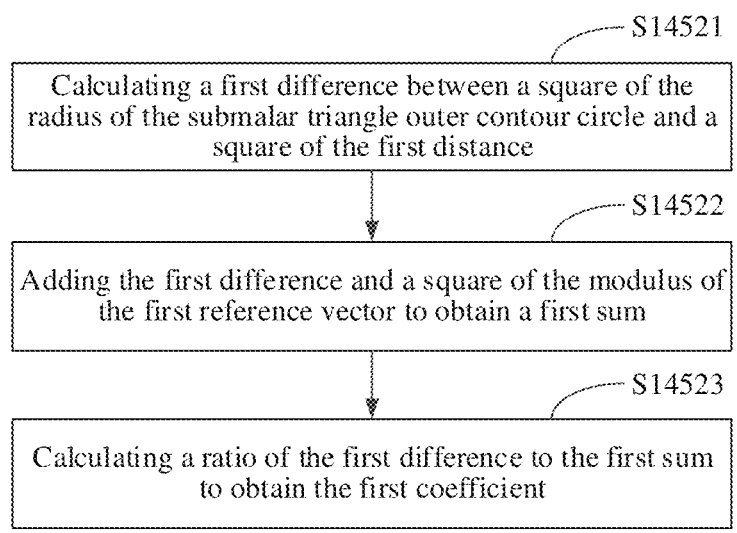
FIG. 12 is an exemplary schematic flowchart of operation S1452 of a face image processing method according to the embodiments of the present disclosure.

FIG. 12 is an exemplary schematic flowchart of operation S1452 of a face image processing method according to the embodiments of the present disclosure. As shown in FIG. 12, operation S1452 may include operations S14521 to S14523.

In operation S14521, a first difference between a square of the radius of the submalar triangle outer contour circle and a square of the first distance is calculated.

For example, the first difference is equal to $R^2-|\vec{P}_2-\vec{O}|^2$.

In operation S14522, the first difference and a square of the modulus of the first reference vector are added to obtain a first sum.

For example, the first sum is equal to $R^2-|\vec{P}_2-\vec{O}|^2+|\vec{M}_1-\vec{O}|^2$.

In operation S14523, a ratio of the first difference to the first sum is calculated to obtain the first coefficient.

For example, the first coefficient is $$\alpha_1 = \frac{R^2-|\vec{P}_2-\vec{O}|^2}{R^2-|\vec{P}_2-\vec{O}|^2+|\vec{M}_1-\vec{O}|^2}.$$

In some embodiments of the present disclosure, the operations S14521 to S14523 may be executed by a processor by invoking a corresponding instruction stored in a memory, or executed by corresponding module run by the processor.

Figure 13:
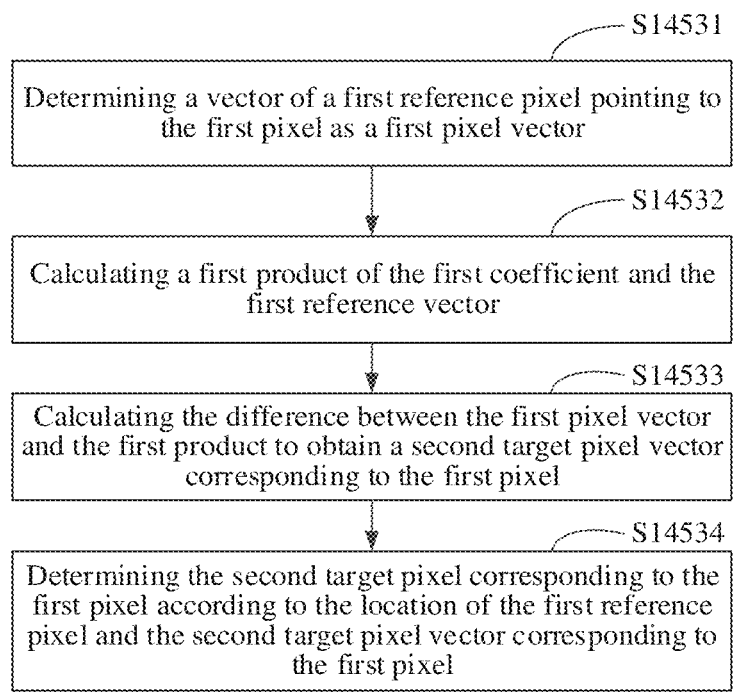
FIG. 13 is an exemplary schematic flowchart of operation S1453 of a face image processing method according to the embodiments of the present disclosure.

FIG. 13 is an exemplary schematic flowchart of operation S1453 of a face image processing method according to the embodiments of the present disclosure. As shown in FIG. 13, operation S1453 may include operations S14531 to S14534.

In operation S14531, a vector that points from a first reference pixel to the first pixel is determined as a first pixel vector.

For example, the first pixel vector may be represented as $\vec{P}_2$.

In operation S14532, a first product of the first coefficient and the first reference vector is calculated.

For example, the first product of the first coefficient and the first reference vector is $\alpha_1(\vec{M}_1-\vec{O})$.

In operation S14533, the difference between the first pixel vector and the first product is calculated to obtain a second target pixel vector corresponding to the first pixel.

For example, the second target pixel vector corresponding to the first pixel is $\vec{P}_2'=\vec{P}_2-\alpha_1(\vec{M}_1-\vec{O})$.

In operation S14534, the second target pixel corresponding to the first pixel is determined according to the location of the first reference pixel and the second target pixel vector corresponding to the first pixel.

The second target pixel vector $\vec{P}_2'$ corresponding to the first pixel represents a vector of the first reference pixel pointing to the second target pixel $P_2'$. The second target pixel $P_2'$ corresponding to the first pixel may be determined according to the location of the first reference pixel and the second target pixel vector $P_2'$ corresponding to the first pixel.

In some embodiments of the present disclosure, the operations S14531 to S14534 may be executed by a processor by invoking a corresponding instruction stored in a memory, or executed by corresponding module run by the processor.

Figure 14:
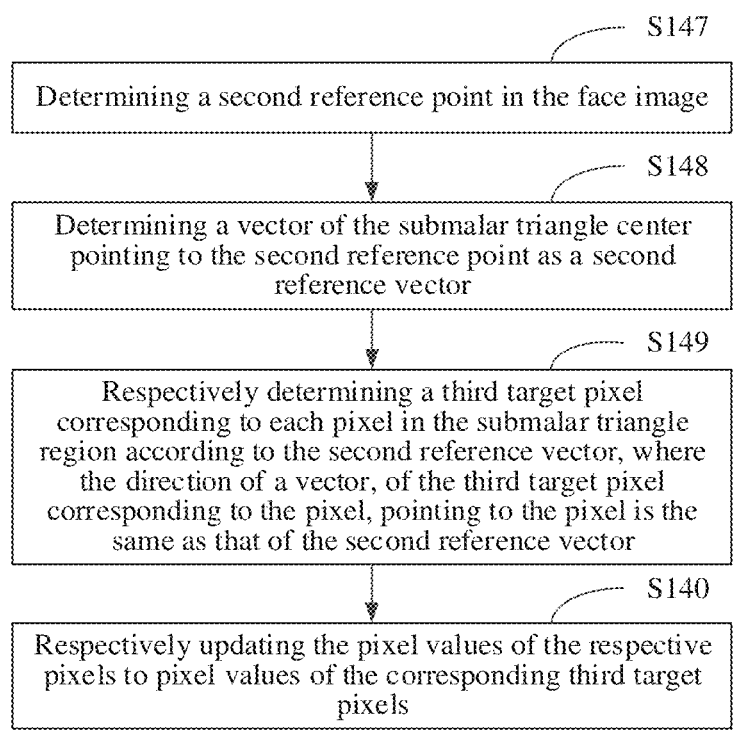
FIG. 14 is an exemplary schematic flowchart of operation S14 of a face image processing method according to the embodiments of the present disclosure.

FIG. 14 is an exemplary schematic flowchart of operation S14 of a face image processing method according to the embodiments of the present disclosure. As shown in FIG. 14, operation S14 may include operations S147, S148, S149, and S140.

In operation S147, a second reference point in the face image is determined.

In a possible implementation, the distance between the second reference point and a lower eyelid key point is less than the distance between the submalar triangle center and the lower eyelid key point.

In a possible implementation, the second reference point is outside the submalar triangle region.

In a possible implementation, the second reference point is positioned on a line connecting the submalar triangle center and a key point of lower eyelid.

For example, the second reference point in the face image is $M_2$.

In operation S148, a vector that points from the submalar triangle center to the second reference point is determined as a second reference vector.

For example, if the submalar triangle center is O, $\vec{O}$ represents a vector of a second reference pixel pointing to the submalar triangle center, the second reference point is $M_2$, and $M_2$ represents a vector of the second reference pixel pointing to the second reference point, the second reference vector may be represented as $\vec{M}_2-\vec{O}$. The second reference pixel may be the origin of a coordinate axis.

In operation S149, a third target pixel corresponding to each pixel in the submalar triangle region is respectively determined according to the second reference vector, where the direction of a vector that points from the third target pixel to its corresponding pixel is the same as that of the second reference vector.

In operation S140, the pixel values of the respective pixels are respectively updated to pixel values of the corresponding third target pixels.

For example, if the third target pixel corresponding to pixel $P_3$ in the submalar triangle region is pixel $P_3'$, the pixel value of pixel $P_3$ may be updated to the pixel value of pixel $P_3'$, that is, the pixel value of pixel $P_3'$ is taken as the pixel value of pixel $P_3$.

In some embodiments of the present disclosure, the operations S147, S148, S149, and S140 may be executed by a processor by invoking a corresponding instruction stored in a memory, or executed by corresponding module run by the processor.

In the example shown in FIG. 14, the location of the submalar triangle is raised using a circular liquefaction deformation method, thereby integrally raising the submalar triangle and making the face more vibrant. The range of deformation in this example is constrained and determined by both the submalar triangle region and the submalar triangle center.

Figure 15:
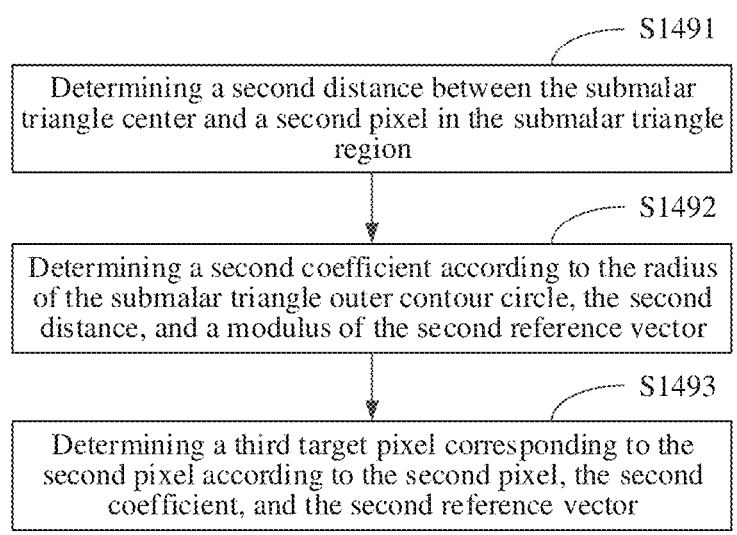
FIG. 15 is an exemplary schematic flowchart of operation S149 of a face image processing method according to the embodiments of the present disclosure.

FIG. 15 is an exemplary schematic flowchart of operation S149 of a face image processing method according to the embodiments of the present disclosure. As shown in FIG. 15, operation S149 may include operations S1491 to S1493.

In operation S1491, a second distance between the submalar triangle center and a second pixel in the submalar triangle region is determined.

For example, if the submalar triangle center is O, the second pixel in the submalar triangle region is $P_3$, $\vec{O}$ represents the vector of the second reference pixel pointing to the submalar triangle center, and $\vec{P}_3$ represents a vector of the second reference pixel pointing to the second pixel, the second distance between the submalar triangle center and the second pixel in the submalar triangle region may be represented as $|\vec{P}_3 - \vec{O}|$.

In operation S1492, a second coefficient is determined according to the radius of the submalar triangle outer contour circle, the second distance, and a modulus of the second reference vector.

For example, the radius of the submalar triangle outer contour circle is R, the second distance is $|\vec{P}_3 - \vec{O}|$ the second reference vector is $|\vec{M}_2 - \vec{O}|$, and the second coefficient is $\alpha_2$.

In operation S1493, a third target pixel corresponding to the second pixel is determined according to the second pixel, the second coefficient, and the second reference vector.

In some embodiments of the present disclosure, the operations S1491 to S1493 may be executed by a processor by invoking a corresponding instruction stored in a memory, or executed by corresponding module run by the processor.

Figure 16:
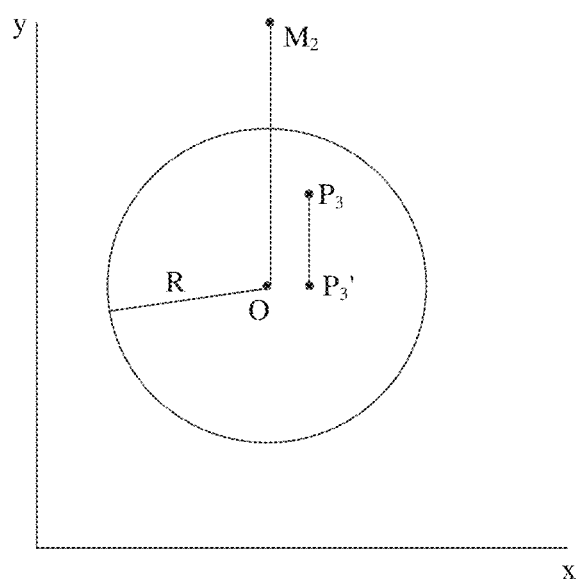
FIG. 16 is a schematic diagram of a submalar triangle center O, a second reference point M2, a second pixel P3, a third target pixel P3' corresponding to the second pixel, and the radius R of a submalar triangle outer contour circle in a face image processing method according to the embodiments of the present disclosure.

FIG. 16 is a schematic diagram of a submalar triangle center O, a second reference point $M_2$, a second pixel $P_3$, a third target pixel $P_3'$ corresponding to the second pixel, and the radius R of a submalar triangle outer contour circle in a face image processing method according to the embodiments of the present disclosure.

Figure 17:
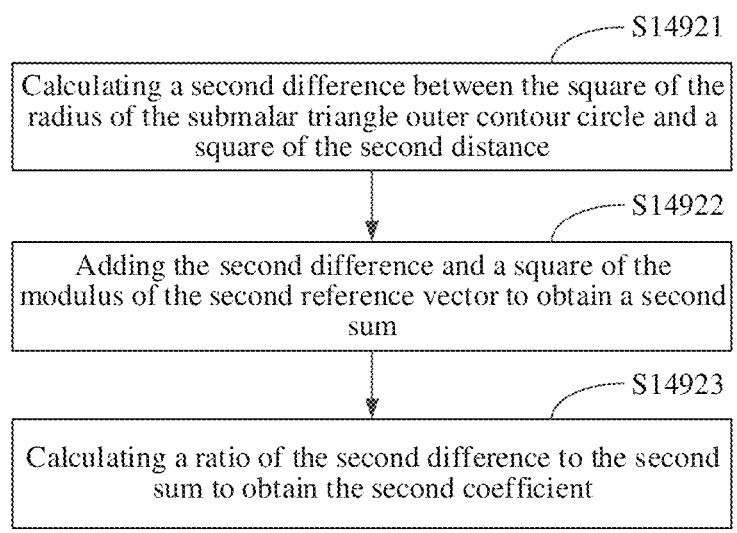
FIG. 17 is an exemplary schematic flowchart of operation S1492 of a face image processing method according to the embodiments of the present disclosure.

FIG. 17 is an exemplary schematic flowchart of operation S1492 of a face image processing method according to the embodiments of the present disclosure. As shown in FIG. 17, operation S1492 may include operations S14921 to S14923.

In operation S14921, a second difference between a square of the radius of the submalar triangle outer contour circle and a square of the second distance is calculated.

For example, the second difference is equal to $R^2 - |\vec{P}_3 - \vec{O}|^2$.

In operation S14922, the second difference and a square of the modulus of the second reference vector are added to obtain a second sum.

For example, the second sum is equal to $R^2 - |\vec{P}_3 - \vec{O}|^2 + |\vec{M}_2 - \vec{O}|^2$.

In operation S14923, a ratio of the second difference to the second sum is calculated to obtain the second coefficient.

For example, the second coefficient is $$\alpha_1 = \frac{R^2 - |\vec{P}_3 - \vec{O}|^2}{R^2 - |\vec{P}_3 - \vec{O}|^2 + |\vec{M}_1 - \vec{O}|^2}.$$

In some embodiments of the present disclosure, the operations S14921 to S14923 may be executed by a processor by invoking a corresponding instruction stored in a memory, or executed by corresponding module run by the processor.

Figure 18:
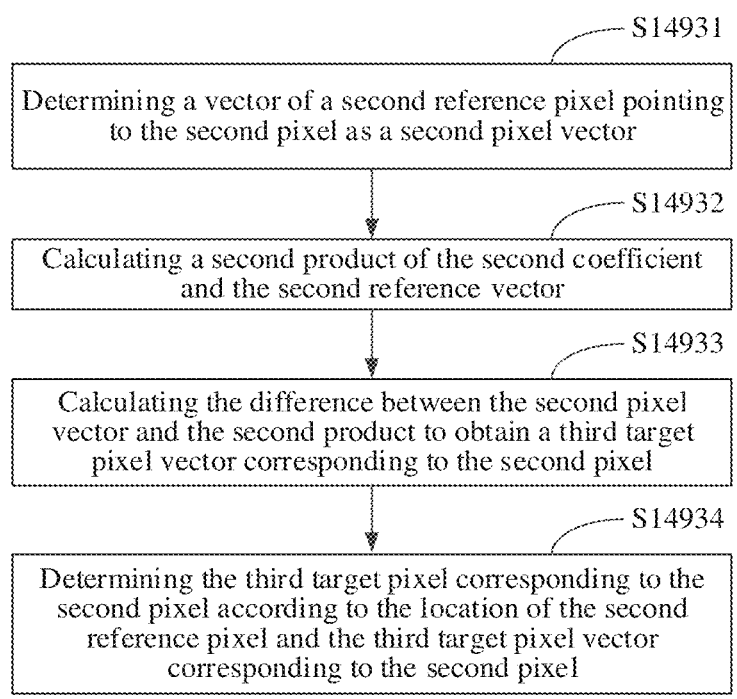
FIG. 18 is an exemplary schematic flowchart of operation S1493 of a face image processing method according to the embodiments of the present disclosure.

FIG. 18 is an exemplary schematic flowchart of operation S1493 of a face image processing method according to the embodiments of the present disclosure. As shown in FIG. 18, operation S1493 may include operations S14931 to S14934.

In operation S14931, a vector that points from a second reference pixel to the second pixel is determined as a second pixel vector.

For example, the second pixel vector may be represented as $\vec{P}_3$.

In operation S14932, a second product of the second coefficient and the second reference vector is calculated.

For example, the second product of the second coefficient and the second reference vector is $\alpha_2 (\vec{M}_2 - \vec{O})$.

In operation S14933, the difference between the second pixel vector and the second product is calculated to obtain a third target pixel vector corresponding to the second pixel.

For example, the third target pixel vector corresponding to the second pixel is $\vec{P}_3' = \vec{P}_3 - \alpha_2(\vec{M}_2 - \vec{O})$.

In operation S14934, the third target pixel corresponding to the second pixel is determined according to the location of the second reference pixel and the third target pixel vector corresponding to the second pixel.

The third target pixel vector $\vec{P}_3'$ corresponding to the second pixel represents a vector of the second reference pixel pointing to the third target pixel $P_3'$. The third target pixel $\vec{P}_3'$ corresponding to the second pixel may be determined according to the location of the second reference pixel and the third target pixel vector $P_3'$ corresponding to the second pixel.

In a possible implementation, operation S14 may sequentially include operations S141 and S142, operations S143 to S146, and operations S147 to S140.

In another possible implementation, operation S14 may sequentially include operations S141 and S142, and operations S147 to S140.

In another possible implementation, operation S14 may sequentially include operations S141 and S142, operations S147 to S140, and operations S143 to S146.

In another possible implementation, operation S14 may sequentially include operations S143 to S146, operations S141 and S142, and operations S147 to S140.

It should be noted that although operation S14 is described above with the foregoing implementations, persons skilled in the art can understand that the embodiments of the present disclosure is not limited thereto. Persons skilled in the art can flexibly configure the specific implementation of operation S14 according to actual application scenarios and/or personal preferences, as long as operation S14 is implemented according to one, or two, or three, of a first group of operations, a second group of operations, and a third group of operations. The first group of operations represents operations S141 and S142, the second group of operations represents operations S143 to S146, and the third group of operations represents operations S147 to S140.

In some embodiments of the present disclosure, the operations S14931 to S14934 may be executed by a processor by invoking a corresponding instruction stored in a memory, or executed by corresponding module run by the processor.

Figure 19:
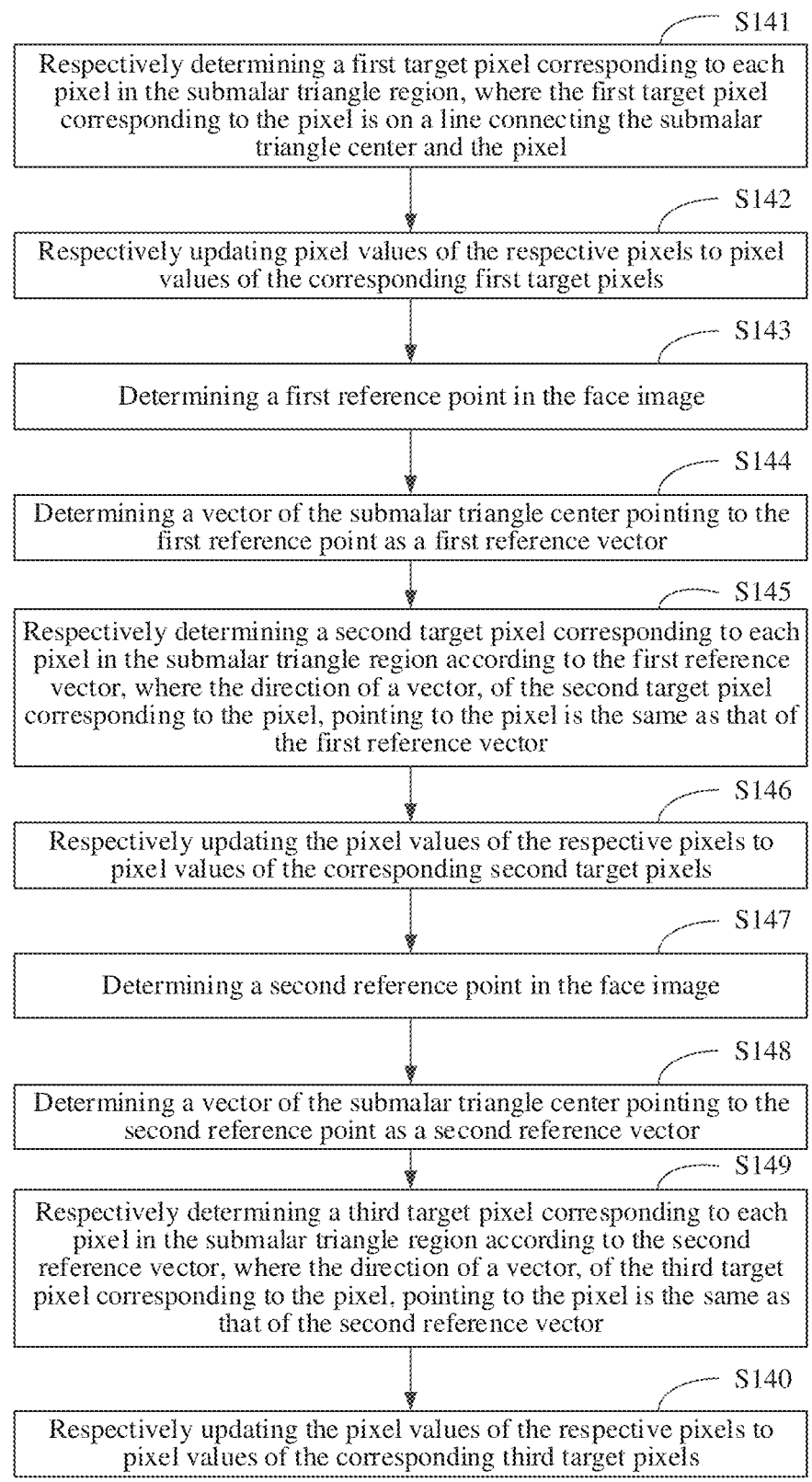
FIG. 19 is an exemplary schematic flowchart of operation S14 of a face image processing method according to the embodiments of the present disclosure.

FIG. 19 is an exemplary schematic flowchart of operation S14 of a face image processing method according to the embodiments of the present disclosure. As shown in FIG. 19, operation S14 may include operations S141 to S140. For description of the operations, reference is made to the above, and details are not described herein again.

In operation S141, a first target pixel corresponding to each pixel in the submalar triangle region is respectively determined, where the first target pixel corresponding to the pixel is positioned on a line connecting the submalar triangle center and the pixel.

In operation S142, pixel values of the respective pixels are respectively updated to pixel values of the corresponding first target pixels.

In operation S143, a first reference point in the face image is determined.

In operation S144, a vector that points from the submalar triangle center to the first reference point is determined as a first reference vector.

In operation S145, a second target pixel corresponding to each pixel in the submalar triangle region is respectively determined according to the first reference vector, where the direction of a vector that points from the second target pixel to its corresponding pixel is the same as that of the first reference vector.

In operation S146, the pixel values of the respective pixels are respectively updated to pixel values of the corresponding second target pixels.

In operation S147, a second reference point in the face image is determined.

In operation S148, a vector that points from the submalar triangle center to the second reference point is determined as a second reference vector.

In operation S149, a third target pixel corresponding to each pixel in the submalar triangle region is respectively determined according to the second reference vector, where the direction of a vector that points from the third target pixel to its corresponding pixel is the same as that of the second reference vector.

In operation S140, the pixel values of the respective pixels are respectively updated to pixel values of the corresponding third target pixels.

In some embodiments of the present disclosure, the above operations S141 to S140 may be executed by a processor by invoking a corresponding instruction stored in a memory, or executed by corresponding module run by the processor.

In the embodiments of the present disclosure, the submalar triangle filling method adopted only involves a deformation method, and the light and shadow distribution of the face is hardly changed. Thus, the submalar triangle filling effect is more natural.

It should be understood that the foregoing various method embodiments mentioned in the embodiments of the present disclosure may be combined with each other to form a combined embodiment without departing from the principle logic. Details are not described herein again due to space limitation.

In addition, the embodiments of the present disclosure further provide a face image processing apparatus, an electronic device, a computer-readable storage medium, and a program, which can all be used to implement any of the face image processing methods provided by the present disclosure. For the corresponding technical solutions and descriptions, please refer to the corresponding content in the method section. Details are not described herein again.

Figure 20:
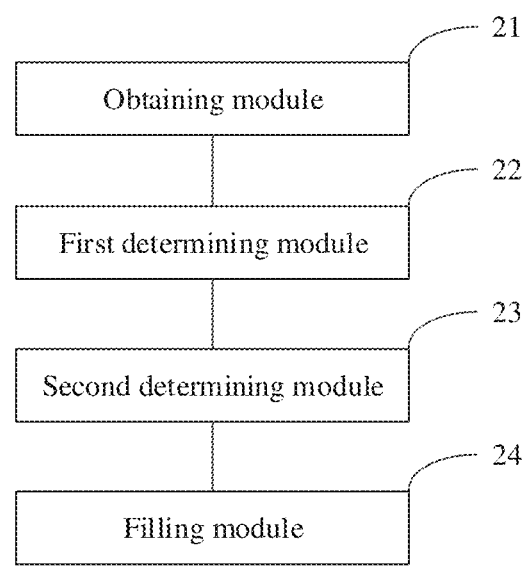
FIG. 20 is a schematic structural diagram of a face image processing apparatus according to the embodiments of the present disclosure.

FIG. 20 is a schematic structural diagram of a face image processing apparatus according to the embodiments of the present disclosure. As shown in FIG. 20, the apparatus includes: an obtaining module 21, configured to obtain face key points and a face deflection angle in a face image; a first determining module 22, configured to determine a submalar triangle center in the face image according to the face key points and the face deflection angle; a second determining module 23, configured to determine a submalar triangle region in the face image according to the face key points and the submalar triangle center; and a filling module 24, configured to perform color filling on the submalar triangle region.

Figure 21:
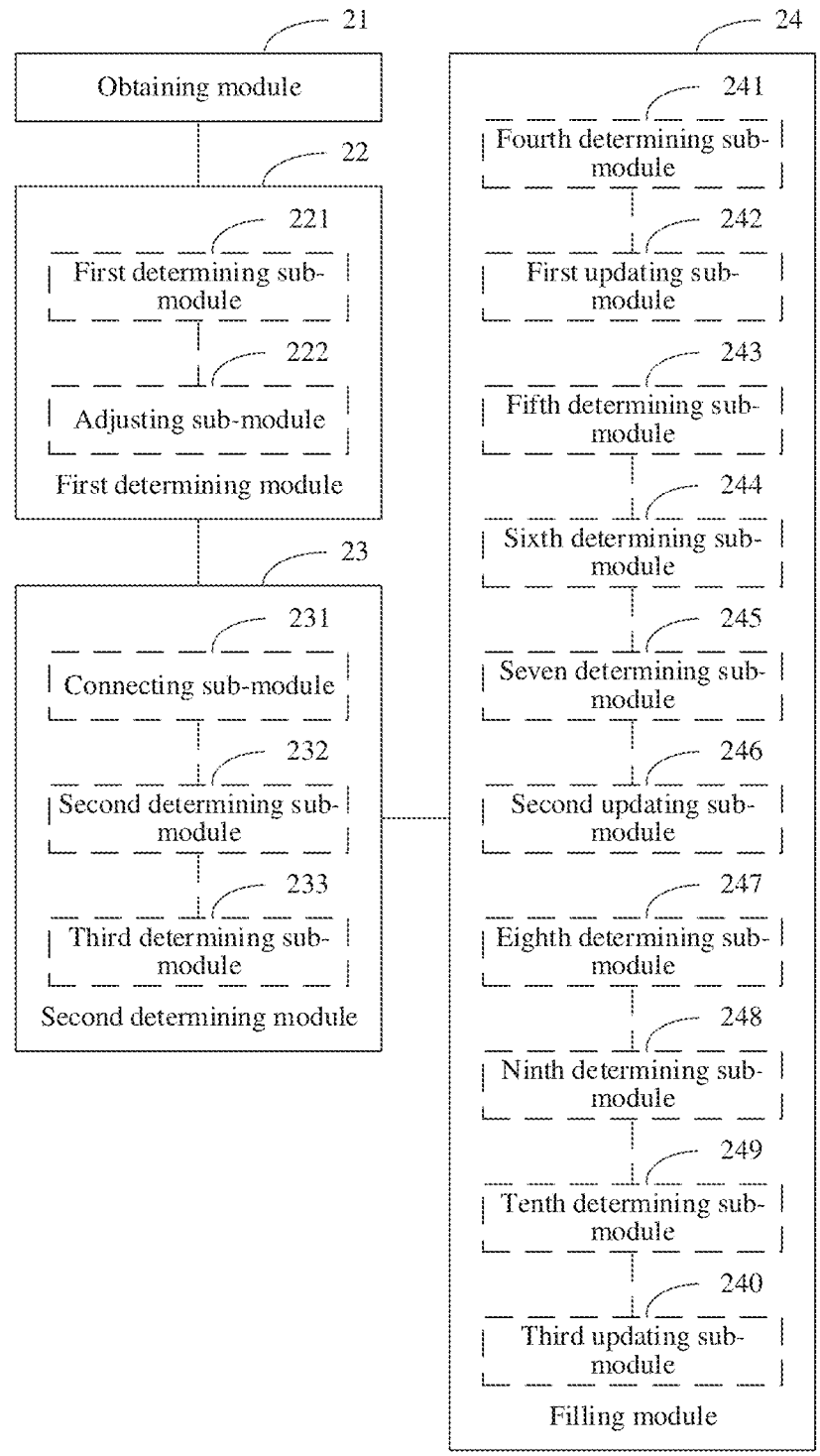
FIG. 21 is an exemplary schematic structural diagram of a face image processing apparatus according to the embodiments of the present disclosure.

FIG. 21 is an exemplary schematic structural diagram of a face image processing apparatus according to the embodiments of the present disclosure. As shown in FIG. 21.

In a possible implementation, the first determining module 22 includes: a first determining sub-module 221, configured to determine an estimated location of the submalar triangle center in the face image by performing interpolation on the face key points; and an adjusting sub-module 222, configured to adjust the estimated location of the submalar triangle center according to the face deflection angle to obtain the submalar triangle center in the face image.

In a possible implementation, the second determining module 23 includes: a connecting sub-module 231, configured to connect the face key points to obtain a polygon corresponding to the face key points; a second determining sub-module 232, configured to determine a maximum circle centered on the submalar triangle center in the polygon as a submalar triangle outer contour circle in the face image; and a third determining sub-module 233, configured to determine the submalar triangle region in the face image according to the submalar triangle outer contour circle.

In a possible implementation, the third determining sub-module 233 is configured to: adjust the submalar triangle outer contour circle by using a facial contour line in the face image to obtain the submalar triangle region in the face image.

In a possible implementation, the third determining sub-module 233 includes: a first sampling unit, configured to sample the facial contour line in the face image to obtain a sample point on the facial contour line; a second sampling unit, configured to sample the submalar triangle outer contour circle to obtain a sample point on the submalar triangle outer contour circle; and a curve fitting unit, configured to perform curve fitting on the sample point on the facial contour line and the sample point on the submalar triangle outer contour circle to obtain the submalar triangle region in the face image.

In a possible implementation, the filling module 24 includes: a fourth determining sub-module 241, configured to respectively determine a first target pixel corresponding to each pixel in the submalar triangle region, where the first target pixel corresponding to the pixel is positioned on a line connecting the submalar triangle center and the pixel; and a first updating sub-module 242, configured to respectively update pixel values of the respective pixels to pixel values of the corresponding first target pixels.

In a possible implementation, the fourth determining sub-module 241 is configured to: respectively determine the first target pixel corresponding to each pixel in the submalar triangle region according to a submalar triangle filling strength coefficient.

In a possible implementation, the fourth determining sub-module 241 is configured to: respectively determine the first target pixel corresponding to each pixel in the submalar triangle region by using a convex downward function having a second derivative constantly greater than 0.

In a possible implementation, the filling module 24 includes: a fifth determining sub-module 243, configured to determine a first reference point in the face image; a sixth determining sub-module 244, configured to determine a vector of the submalar triangle center pointing to the first reference point as a first reference vector; a seventh determining sub-module 245, configured to respectively determine a second target pixel corresponding to each pixel in the submalar triangle region according to the first reference vector, where the direction of a vector, of the second target pixel corresponding to the pixel, pointing to the pixel is the same as that of the first reference vector; and a second updating sub-module 246, configured to respectively update the pixel values of the respective pixels to pixel values of the corresponding second target pixels.

In a possible implementation, the distance between the first reference point and a nose tip key point is greater than the distance between the submalar triangle center and the nose tip key point.

In a possible implementation, the seventh determining sub-module 245 includes: a first determining unit, configured to determine a first distance between the submalar triangle center and a first pixel in the submalar triangle region; a second determining unit, configured to determine a first coefficient according to the radius of the submalar triangle outer contour circle, the first distance, and a modulus of the first reference vector; and a third determining unit, configured to determine a second target pixel corresponding to the first pixel according to the first pixel, the first coefficient, and the first reference vector.

In a possible implementation, the second determining unit includes: a first calculating sub-unit, configured to calculate a first difference between a square of the radius of the submalar triangle outer contour circle and a square of the first distance; a second calculating sub-unit, configured to add the first difference and a square of the modulus of the first reference vector to obtain a first sum; and a third calculating sub-unit, configured to calculate a ratio of the first difference to the first sum to obtain the first coefficient.

In a possible implementation, the third determining unit includes: a first calculating sub-unit, configured to determine a vector that points from a first reference pixel to the first pixel as a first pixel vector; a fourth calculating sub-unit, configured to calculate a first product of the first coefficient and the first reference vector; a fifth calculating sub-unit, configured to calculate the difference between the first pixel vector and the first product to obtain a second target pixel vector corresponding to the first pixel; and a second determining sub-unit, configured to determine the second target pixel corresponding to the first pixel according to the location of the first reference pixel and the second target pixel vector corresponding to the first pixel.

In a possible implementation, the filling module 24 includes: an eighth determining sub-module 247, configured to determine a second reference point in the face image; a ninth determining sub-module 248, configured to determine a vector that points from the submalar triangle center to the second reference point as a second reference vector; a tenth determining sub-module 249, configured to respectively determine a third target pixel corresponding to each pixel in the submalar triangle region according to the second reference vector, where the direction of a vector, that points from the third target pixel to its corresponding pixel is the same as that of the second reference vector; and a third updating sub-module 240, configured to respectively update the pixel values of the respective pixels to pixel values of the corresponding third target pixels.

In a possible implementation, the second reference point is positioned on a line connecting the submalar triangle center and a key point of lower eyelid.

In a possible implementation, the tenth determining sub-module 249 includes: a fourth determining unit, configured to determine a second distance between the submalar triangle center and a second pixel in the submalar triangle region; a fifth determining unit, configured to determine a second coefficient according to the radius of the submalar triangle outer contour circle, the second distance, and a modulus of the second reference vector; and a sixth determining unit, configured to determine a third target pixel corresponding to the second pixel according to the second pixel, the second coefficient, and the second reference vector.

In a possible implementation, the fifth determining unit includes: a sixth calculating sub-unit, configured to calculate a second difference between the square of the radius of the submalar triangle outer contour circle and a square of the second distance; a seventh calculating sub-unit, configured to add the second difference and a square of the modulus of the second reference vector to obtain a second sum; and an eighth calculating sub-unit, configured to calculate a ratio of the second difference to the second sum to obtain the second coefficient.

In a possible implementation, the sixth determining unit includes: a third determining sub-unit, configured to determine a vector that points from a second reference pixel to the second pixel as a second pixel vector; a ninth calculating sub-unit, configured to calculate a second product of the second coefficient and the second reference vector; a tenth calculating sub-unit, configured to calculate the difference between the second pixel vector and the second product to obtain a third target pixel vector corresponding to the second pixel; and a fourth determining sub-unit, configured to determine the third target pixel corresponding to the second pixel according to the location of the second reference pixel and the third target pixel vector corresponding to the second pixel.

In a possible implementation, the filling module 24 includes: a fourth determining sub-module 241, configured to respectively determine a first target pixel corresponding to each pixel in the submalar triangle region, where the first target pixel corresponding to the pixel is positioned on a line connecting the submalar triangle center and the pixel; a first updating sub-module 242, configured to respectively update pixel values of the respective pixels to pixel values of the corresponding first target pixels; a fifth determining sub-module 243, configured to determine a first reference point in the face image; a sixth determining sub-module 244, configured to determine a vector that points from the submalar triangle center to the first reference point as a first reference vector; a seventh determining sub-module 245, configured to respectively determine a second target pixel corresponding to each pixel in the submalar triangle region according to the first reference vector, where the direction of a vector, of the second target pixel corresponding to the pixel, pointing to the pixel is the same as that of the first reference vector; a second updating sub-module 246, configured to respectively update the pixel values of the respective pixels to pixel values of the corresponding second target pixels; an eighth determining sub-module 247, configured to determine a second reference point in the face image; a ninth determining sub-module 248, configured to determine a vector that points from the submalar triangle center to the second reference point as a second reference vector; a tenth determining sub-module 249, configured to respectively determine a third target pixel corresponding to each pixel in the submalar triangle region according to the second reference vector, where the direction of a vector, of the third target pixel corresponding to the pixel, pointing to the pixel is the same as that of the second reference vector; and a third updating sub-module 240, configured to respectively update the pixel values of the respective pixels to pixel values of the corresponding third target pixels.

In the embodiments of the present disclosure, by obtaining face key points and a face deflection angle in a face image, determining a submalar triangle center in the face image according to the face key points and the face deflection angle, determining a submalar triangle region in the face image according to the face key points and the submalar triangle center, and performing color filling on the submalar triangle region, the submalar triangle region can be accurately determined, and submalar triangle filling is performed based on the accurately positioned submalar triangle region, thereby obtaining a more natural filling effect.

The embodiments of the present disclosure further provide a computer-readable storage medium, having computer program instructions stored thereon, where when the computer program instructions are executed by a processor, the foregoing methods are implemented. The computer-readable storage medium may be a non-volatile computer-readable storage medium.

The embodiments of the present disclosure further provide an electronic device, including: a processor, and a memory for storing processor executable instructions; where when the processor is configured to execute a computer program, the foregoing method according to the embodiments of the present disclosure is performed.

The electronic device may be provided as a terminal, a server, or other forms of devices.

Figure 22:
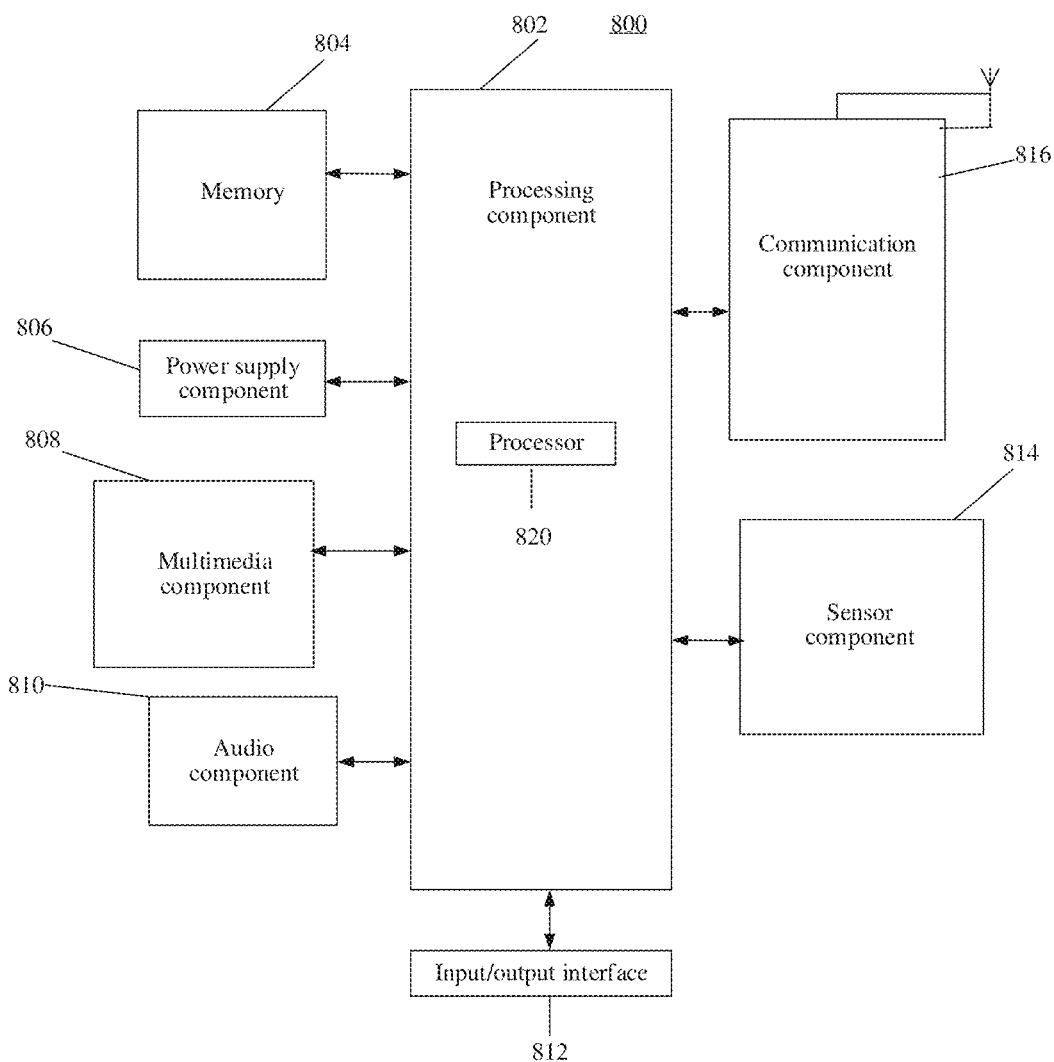
FIG. 22 is a schematic structural diagram of an electronic device 800 according to an exemplary embodiment.

FIG. 22 is a schematic structural diagram of an electronic device 800 according to an exemplary embodiment. For example, the electronic device 800 may be a terminal such as a mobile phone, a computer, a digital broadcast terminal, a message transceiving device, a game console, a tablet device, a medical device, exercise equipment, and a personal digital assistant.

With reference to FIG. 22, the electronic device 800 may include one or more of the following components: a processing component 802, a memory 804, a power supply component 806, a multimedia component 808, an audio component 810, an Input/Output (I/O) interface 812, a sensor component 814, and a communication component 816.

The processing component 802 generally controls overall operation of the electronic device 800, such as operations associated with display, phone calls, data communications, camera operations, and recording operations. The processing component 802 may include one or more processors 820 to execute instructions to implement all or some of the operations of the method above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations on the electronic device 800. Examples of the data include instructions for any application or method operated on the electronic device 800, contact data, contact list data, messages, pictures, videos, and the like. The memory 804 may be implemented by any type of volatile or non-volatile storage device, or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or an optical disk.

The power supply component 806 provides power for various components of the electronic device 800. The power supply component 806 may include a power management system, one or more power supplies, and other components associated with power generation, management, and distribution for the electronic device 800.

The multimedia component 808 includes a screen between the electronic device 800 and a user that provides an output interface. In some embodiments, the screen may include a Liquid Crystal Display (LCD) and a Touch Panel (TP). If the screen includes a TP, the screen may be implemented as a touch screen to receive input signals from the user. The TP includes one or more touch sensors for sensing touches, swipes, and gestures on the TP. The touch sensor may not only sense the boundary of a touch or swipe action, but also detect the duration and pressure related to the touch or swipe operation. In some embodiments, the multimedia component 808 includes a front-facing camera and/or a rear-facing camera. When the electronic device 800 is in an operation mode, for example, a photography mode or a video mode, the front-facing camera and/or the rear-facing camera may receive external multimedia data. Each of the front-facing camera and the rear-facing camera may be a fixed optical lens system, or have focal length and optical zoom capabilities.

The audio component 810 is configured to output and/or input an audio signal. For example, the audio component 810 includes a microphone (MIC), and the microphone is configured to receive an external audio signal when the electronic device 800 is in an operation mode, such as a calling mode, a recording mode, and a voice recognition mode. The received audio signal may be further stored in the memory 804 or transmitted by means of the communication component 816. In some embodiments, the audio component 810 further includes a speaker for outputting the audio signal.

The I/O interface 812 provides an interface between the processing component 802 and a peripheral interface module, which may be a keyboard, a click wheel, a button, etc. The button may include, but is not limited to, a home button, a volume button, a start button, and a lock button.

The sensor component 814 includes one or more sensors for providing state assessment in various aspects for the electronic device 800. For example, the sensor component 814 may detect an on/off state of the electronic device 800, and relative positioning of components, which are the display and keypad of the electronic device 800, for example, and the sensor component 814 may further detect a location change of the electronic device 800 or a component of the electronic device 800, the presence or absence of contact of the user with the electronic device 800, the orientation or acceleration/deceleration of the electronic device 800, and a temperature change of the electronic device 800. The sensor component 814 may include a proximity sensor, which is configured to detect the presence of a nearby object when there is no physical contact. The sensor component 814 may also include a light sensor, such as a Complementary Metal Oxide Semiconductor (CMOS) or a Charge Coupled Device (CCD) image sensor, for use in an imaging application. In some embodiments, the sensor component 814 may further include an acceleration sensor, a gyroscope sensor, a magnetic sensor, a pressure sensor, or a temperature sensor.

The communication component 816 is configured to facilitate wired or wireless communications between the electronic device 800 and other devices. The electronic device 800 may access a wireless network based on a communication standard, such as WiFi, 2G, or 3G, or a combination thereof. In an exemplary embodiment, the communication component 816 receives a broadcast signal or broadcast-related information from an external broadcast management system by means of a broadcast channel In an exemplary embodiment, the communication component 816 further includes a Near Field Communication (NFC) module to facilitate short-range communication. For example, the NFC module may be implemented based on Radio Frequency Identification (RFID) technology, Infrared Data Association (IrDA) technology, Ultra Wideband (UWB) technology, Bluetooth (BT) technology, and other technologies.

In an exemplary embodiment, the electronic device 800 may be implemented by one or more Application-Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, microcontrollers, microprocessors, or other electronic elements, to execute the method above.

In an exemplary embodiment, a non-volatile computer-readable storage medium is further provided, for example, a memory 804 including computer program instructions, which can executed by the processor 820 of the electronic device 800 to implement the method above.

Figure 23:
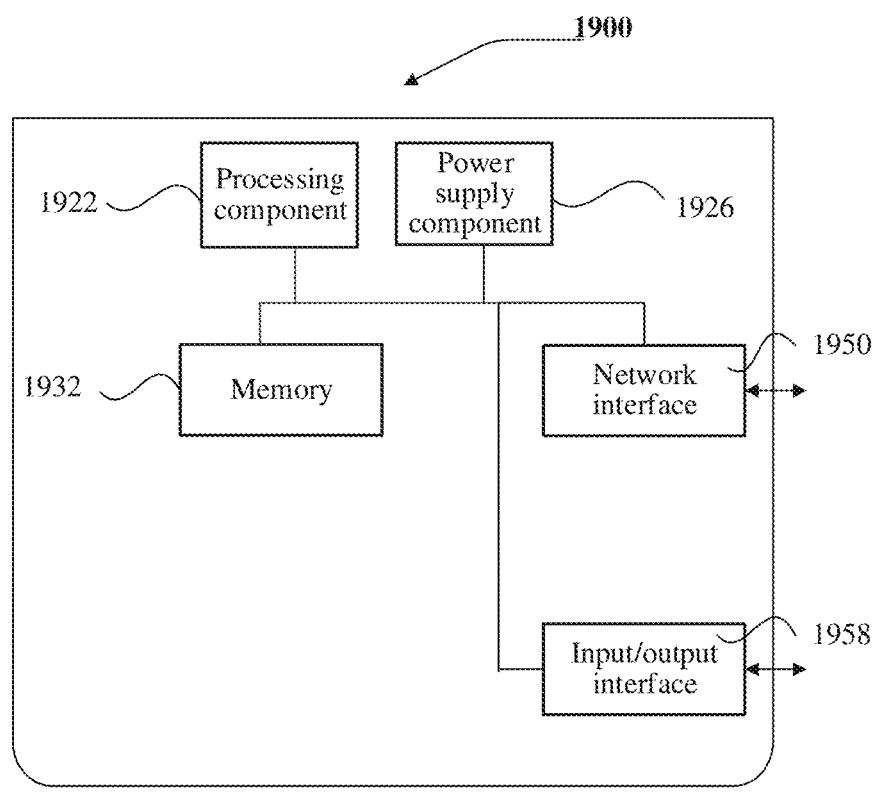
FIG. 23 is a schematic structural diagram of an electronic device 1900 according to an exemplary embodiment.

FIG. 23 is a schematic structural diagram of an electronic device 1900 according to an exemplary embodiment. For example, the electronic device 1900 may be provided as a server. With reference to FIG. 23, the electronic device 1900 includes a processing component 1922 which further includes one or more processors, and a memory resource represented by a memory 1932 and configured to store instructions executable by the processing component 1922, for example, an application program. The application program stored in the memory 1932 may include one or more modules, each of which corresponds to a set of instructions. Further, the processing component 1922 may be configured to execute instructions so as to execute the above method.

The electronic device 1900 may further include a power supply component 1926 configured to execute power management of the electronic device 1900, a wired or wireless network interface 1950 configured to connect the electronic device 1900 to the network, and an I/O interface 1958. The electronic device 1900 may be operated based on an operating system stored in the memory 1932, such as Windows Server™, Mac OS X™, Unix™, Linux™, FreeBSD™ or the like.

In an exemplary embodiment, a non-volatile computer-readable storage medium is further provided, for example, a memory 1932 including computer program instructions, which can be executed by the processing component 1922 of the electronic device 1900 to implement the method above.

The embodiments of the present disclosure may be a system, a method, and/or a computer program product. The computer program product may include a computer-readable storage medium having computer-readable program instructions thereon for causing a processor to implement the aspects of the embodiments of the present disclosure.

The computer-readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer-readable storage medium include: a portable computer diskette, a hard disk, a Random Access Memory (RAM), an ROM, an EPROM (or flash memory), a SRAM, a portable Compact Disk Read-Only Memory (CD-ROM), a Digital Versatile Disc (DVD), a memory stick, a floppy disk, a mechanically encoded device such as punch-cards or raised structure in a groove having instructions stored thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a Local Area Network (LAN), a Wide Area Network (WAN) and/or a wireless network. The network may computer copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer program instructions for carrying out operations of the present disclosure may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In a scenario involving a remote computer, the remote computer may be connected to the user's computer through any type of network, including a LAN or a WAN, or the connection may be made to an external computer (for example, through the Internet using an Internet service provider). In some embodiments, electronic circuitry including, for example, programmable logic circuitry, Field-Programmable Gate Arrays (FGPAs), or Programmable Logic Arrays (PLAs) may execute the computer-readable program instructions by utilizing state information of the computer-readable program instructions to personalize the electronic circuitry, in order to implement the aspects of the present disclosure.

The aspects of the present disclosure are described herein with reference to flowcharts and/or block diagrams of methods, apparatuses (systems), and computer program products according to the embodiments of the present disclosure. It should be understood that each block of the flowcharts and/or block diagrams, and combinations of the blocks in the flowcharts and/or block diagrams can be implemented by computer-readable program instructions.

These computer-readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can cause a computer, a programmable data processing apparatus, and/or other devices to function in a particular manner, such that the computer-readable medium having instructions stored thereon includes an article of manufacture including instructions which implement the aspects of the functions/acts specified in one or more blocks of the flowcharts and/or block diagrams.

The computer-readable program instructions may also be loaded onto a computer, other programmable data processing apparatus, or other device to cause a series of operational operations to be performed on the computer, other programmable apparatus or other device to produce a computer implemented process, such that the instructions which execute on the computer, other programmable apparatus or other device implement the functions/acts specified in one or more blocks of the flowcharts and/or block diagrams.

The flowcharts and block diagrams in the accompanying drawings illustrate the architecture, functionality and operations of possible implementations of systems, methods, and computer program products according to multiple embodiments of the present disclosure. In this regard, each block in the flowchart of block diagrams may represent a module, segment, or portion of instruction, which includes one or more executable instructions for implementing the specified logical function(s). In some alternative implementations, the functions noted in the block may also occur out of the order noted in the accompanying drawings. For example, two blocks shown in succession may, in fact, be executed substantially concurrently, or the blocks may sometimes be executed in the reverse order, depending upon the functionality involved. It should also be noted that each block of the block diagrams and/or flowcharts, and combinations of blocks in the block diagrams and/or flowcharts, can be implemented by special purpose hardware-based systems that perform the specified functions or acts or carried out by combinations of special purpose hardware and computer instructions.

The descriptions of the embodiments of the present disclosure have been presented for purposes of illustration, but are not intended to be exhaustive or limited to the embodiments disclosed. Many modifications and variations will be apparent to persons of ordinary skill in the art without departing from the scope and spirit of the described embodiments. The terminology used herein was chosen to best explain the principles of the embodiments, the practical application or technical improvement over technologies found in the marketplace, or to enable other persons of ordinary skill in the art to understand the embodiments disclosed herein.

The invention claimed is:

1. A face image processing method, comprising:
obtaining face key points and a face deflection angle in a face image;
determining a submalar triangle center in the face image according to the face key points and the face deflection angle;
determining a submalar triangle region in the face image according to the face key points and the submalar triangle center; and
performing color filling on the submalar triangle region, wherein the performing color filling on the submalar triangle region comprises:
determining a first target pixel corresponding to each pixel in the submalar triangle region, wherein the first target pixel corresponding to the pixel is positioned on a line that connects the submalar triangle center and the pixel;
updating a pixel value of each pixel to a pixel value of the corresponding first target pixel corresponding to the pixel;
determining a first reference point in the face image, wherein a distance between the first reference point and a nose tip key point is greater than a distance between the submalar triangle center and the nose tip key point;
determining a vector that points from the submalar triangle center to the first reference point as a first reference vector;
determining a second target pixel corresponding to each pixel in the submalar triangle region according to the first reference vector, wherein direction of a vector that points from the second target pixel to its corresponding pixel is the same as that of the first reference vector;
updating a pixel value of each pixel to a pixel value of the corresponding second target pixel;
determining a second reference point in the face image, wherein the second reference point is positioned on a line that connects the submalar triangle center and a key point of lower eyelid;
determining a vector that points from the submalar triangle center to the second reference point as a second reference vector;
determining a third target pixel corresponding to each pixel in the submalar triangle region according to the second reference vector, wherein a direction of a vector that points from the third target pixel to its corresponding pixel is the same as that of the second reference vector; and
updating a pixel value of each pixel to a pixel value of the third target pixel corresponding to the pixel.

2. The method according to claim 1, wherein the determining a submalar triangle center in the face image according to the face key points and the face deflection angle comprises:
determining an estimated location of the submalar triangle center in the face image by performing interpolation on the face key points; and
adjusting the estimated location of the submalar triangle center according to the face deflection angle to obtain the submalar triangle center in the face image.

3. The method according to claim 1, wherein the determining a submalar triangle region in the face image according to the face key points and the submalar triangle center comprises:
connecting the face key points to obtain a polygon corresponding to the face key points;
determining a maximum circle centered on the submalar triangle center in the polygon as a submalar triangle outer contour circle in the face image; and
determining the submalar triangle region in the face image according to the submalar triangle outer contour circle.

4. The method according to claim 3, wherein the determining the submalar triangle region in the face image according to the submalar triangle outer contour circle comprises:
adjusting the submalar triangle outer contour circle by using a facial contour line in the face image to obtain the submalar triangle region in the face image.

5. The method according to claim 4, wherein the adjusting the submalar triangle outer contour circle by using a facial contour line in the face image to obtain the submalar triangle region in the face image comprises:
sampling the facial contour line in the face image to obtain a sample point on the facial contour line;

sampling the submalar triangle outer contour circle to obtain a sample point on the submalar triangle outer contour circle; and performing curve fitting on the sample point on the facial contour line and the sample point on the submalar triangle outer contour circle to obtain the submalar triangle region in the face image.

6. The method according to claim 1, wherein the performing color filling on the submalar triangle region further comprises:

determining a first target pixel corresponding to each pixel in the submalar triangle region, wherein the first target pixel corresponding to the pixel is positioned on a line connecting the submalar triangle center and the pixel; and updating a pixel value of each pixel to a pixel value of the first target pixel corresponding to the pixel.

7. The method according to claim 6, wherein the determining a first target pixel corresponding to each pixel in the submalar triangle region comprises:

determining the first target pixel corresponding to each pixel in the submalar triangle region according to a submalar triangle filling strength coefficient.

8. The method according to claim 1, wherein the performing color filling on the submalar triangle region further comprises:

determining a first reference point in the face image;
determining a vector that points from the submalar triangle center to the first reference point as a first reference vector;

determining a second target pixel corresponding to each pixel in the submalar triangle region according to the first reference vector, wherein direction of a vector that points from the second target pixel to its corresponding pixel is the same as that of the first reference vector; and updating a pixel value of each pixel to a pixel value of the second target pixel corresponding to the pixel.

9. The method according to claim 8, wherein a distance between the first reference point and a nose tip key point is greater than a distance between the submalar triangle center and the nose tip key point.

10. The method according to claim 8, wherein the determining a second target pixel corresponding to each pixel in the submalar triangle region according to the first reference vector comprises:

determining a first distance between the submalar triangle center and a first pixel in the submalar triangle region;

determining a first coefficient according to a radius of a submalar triangle outer contour circle, the first distance, and a modulus of the first reference vector; and determining a second target pixel corresponding to the first pixel according to the first pixel, the first coefficient, and the first reference vector.

11. The method according to claim 10, wherein the determining a first coefficient according to the radius of the submalar triangle outer contour circle, the first distance, and a modulus of the first reference vector comprises:

calculating a first difference between a square of the radius of the submalar triangle outer contour circle and a square of the first distance;

adding the first difference and a square of the modulus of the first reference vector to obtain a first sum; and calculating a ratio of the first difference to the first sum to obtain the first coefficient.

12. The method according to claim 10, wherein the determining a second target pixel corresponding to the first pixel according to the first pixel, the first coefficient, and the first reference vector comprises:

determining a vector that points from a first reference pixel to the first pixel as a first pixel vector;

calculating a first product of the first coefficient and the first reference vector;

calculating a difference between the first pixel vector and the first product to obtain a second target pixel vector corresponding to the first pixel; and determining the second target pixel corresponding to the first pixel according to a location of the first reference pixel and the second target pixel vector corresponding to the first pixel.

13. The method according to claim 1, wherein the performing color filling on the submalar triangle region further comprises:

determining a second reference point in the face image;
determining a vector that points from the submalar triangle center to the second reference point as a second reference vector;

determining a third target pixel corresponding to each pixel in the submalar triangle region according to the second reference vector, wherein direction of a vector that points from the third target pixel to its corresponding pixel is the same as that of the second reference vector; and updating a pixel value of each pixel to a pixel value of the third target pixel corresponding to the pixel.

14. The method according to claim 13, wherein the second reference point is positioned on a line that connects the submalar triangle center and a key point of lower eyelid.

15. The method according to claim 13, wherein the determining a third target pixel corresponding to each pixel in the submalar triangle region according to the second reference vector comprises:

determining a second distance between the submalar triangle center and a second pixel in the submalar triangle region;

determining a second coefficient according to a radius of a submalar triangle outer contour circle, the second distance, and a modulus of the second reference vector; and determining a third target pixel corresponding to the second pixel according to the second pixel, the second coefficient, and the second reference vector.

16. The method according to claim 15, wherein the determining a second coefficient according to the radius of the submalar triangle outer contour circle, the second distance, and a modulus of the second reference vector comprises:

calculating a second difference between a square of the radius of the submalar triangle outer contour circle and a square of the second distance;

adding the second difference and a square of the modulus of the second reference vector to obtain a second sum; and calculating a ratio of the second difference to the second sum to obtain the second coefficient.

17. The method according to claim 15, wherein the determining a third target pixel corresponding to the second pixel according to the second pixel, the second coefficient, and the second reference vector comprises:

determining a vector that points from a second reference pixel to the second pixel as a second pixel vector;

calculating a second product of the second coefficient and the second reference vector;

calculating a difference between the second pixel vector and the second product to obtain a third target pixel vector corresponding to the second pixel; and determining the third target pixel corresponding to the second pixel according to a location of the second reference pixel and the third target pixel vector corresponding to the second pixel.

18. A face image processing apparatus, comprising:

a processor; and a memory for storing instructions executable by the processor, wherein the processor is configured to:

obtain face key points and a face deflection angle in a face image;

determine a submalar triangle center in the face image according to the face key points and the face deflection angle;

determine a submalar triangle region in the face image according to the face key points and the submalar triangle center; and perform color filling on the submalar triangle region, wherein the performing color filling on the submalar triangle region comprises:

determining a first target pixel corresponding to each pixel in the submalar triangle region, wherein the first target pixel corresponding to the pixel is positioned on a line that connects the submalar triangle center and the pixel;

updating a pixel value of each pixel to a pixel value of the corresponding first target pixel corresponding to the pixel;

determining a first reference point in the face image, wherein a distance between the first reference point and a nose tip key point is greater than a distance between the submalar triangle center and the nose tip key point;

determining a vector that points from the submalar triangle center to the first reference point as a first reference vector;

determining a second target pixel corresponding to each pixel in the submalar triangle region according to the first reference vector, wherein direction of a vector that points from the second target pixel to its corresponding pixel is the same as that of the first reference vector;

updating a pixel value of each pixel to a pixel value of the corresponding second target pixel;

determining a second reference point in the face image, wherein the second reference point is positioned on a line that connects the submalar triangle center and a key point of lower eyelid;

determining a vector that points from the submalar triangle center to the second reference point as a second reference vector;

determining a third target pixel corresponding to each pixel in the submalar triangle region according to the second reference vector, wherein a direction of a vector that points from the third target pixel to its corresponding pixel is the same as that of the second reference vector; and updating a pixel value of each pixel to a pixel value of the third target pixel corresponding to the pixel.

19. A non-transitory computer-readable storage medium, having computer program instructions stored thereon, wherein the computer program instructions, when being executed by a processor, cause the processor to perform the operations of:

obtaining face key points and a face deflection angle in a face image;

determining a submalar triangle center in the face image according to the face key points and the face deflection angle;

determining a submalar triangle region in the face image according to the face key points and the submalar triangle center; and performing color filling on the submalar triangle region, wherein the operation of performing color filling on the submalar triangle region comprises:

determining a first target pixel corresponding to each pixel in the submalar triangle region, wherein the first target pixel corresponding to the pixel is positioned on a line that connects the submalar triangle center and the pixel;

updating a pixel value of each pixel to a pixel value of the corresponding first target pixel corresponding to the pixel;

determining a first reference point in the face image, wherein a distance between the first reference point and a nose tip key point is greater than a distance between the submalar triangle center and the nose tip key point;

determining a vector that points from the submalar triangle center to the first reference point as a first reference vector;

determining a second target pixel corresponding to each pixel in the submalar triangle region according to the first reference vector, wherein direction of a vector that points from the second target pixel to its corresponding pixel is the same as that of the first reference vector;

updating a pixel value of each pixel to a pixel value of the corresponding second target pixel;

determining a second reference point in the face image, wherein the second reference point is positioned on a line that connects the submalar triangle center and a key point of lower eyelid;

determining a vector that points from the submalar triangle center to the second reference point as a second reference vector;

determining a third target pixel corresponding to each pixel in the submalar triangle region according to the second reference vector, wherein a direction of a vector that points from the third target pixel to its corresponding pixel is the same as that of the second reference vector; and updating a pixel value of each pixel to a pixel value of the third target pixel corresponding to the pixel.

* * * * *